United States Patent [19]

Moon

[11] 3,962,813
[45] June 15, 1976

[54] TARGET FISHING ROD

[76] Inventor: Paul G. Moon, 9614 Dona Court, Crown Point, Ind. 46307

[22] Filed: May 19, 1975

[21] Appl. No.: 578,719

[52] U.S. Cl. .................................................. 43/19
[51] Int. Cl.² ....................................... A01K 91/02
[58] Field of Search ........................................ 43/19

[56] References Cited
UNITED STATES PATENTS

| 2,217,820 | 10/1940 | Rowe | 43/19 |
| 2,225,719 | 12/1940 | Shotton | 43/19 |
| 3,015,182 | 1/1962 | Tuttle et al. | 43/19 |

*Primary Examiner*—Russell R. Kinsey
*Assistant Examiner*—Daniel J. Leach
*Attorney, Agent, or Firm*—Sabin C. Bronson

[57] ABSTRACT

A target fishing rod including a grip assembly having means for securing a fishing reel thereto. A triggered float is propelled from the rod to cast the hook into a general target area. This may be used in any restricted area where conventional casting is not feasible.

An alternate rod comprising a plurality of telescopically united sections is removably held in said grip assembly and cast in the conventional manner.

5 Claims, 7 Drawing Figures

U.S. Patent   June 15, 1976   3,962,813
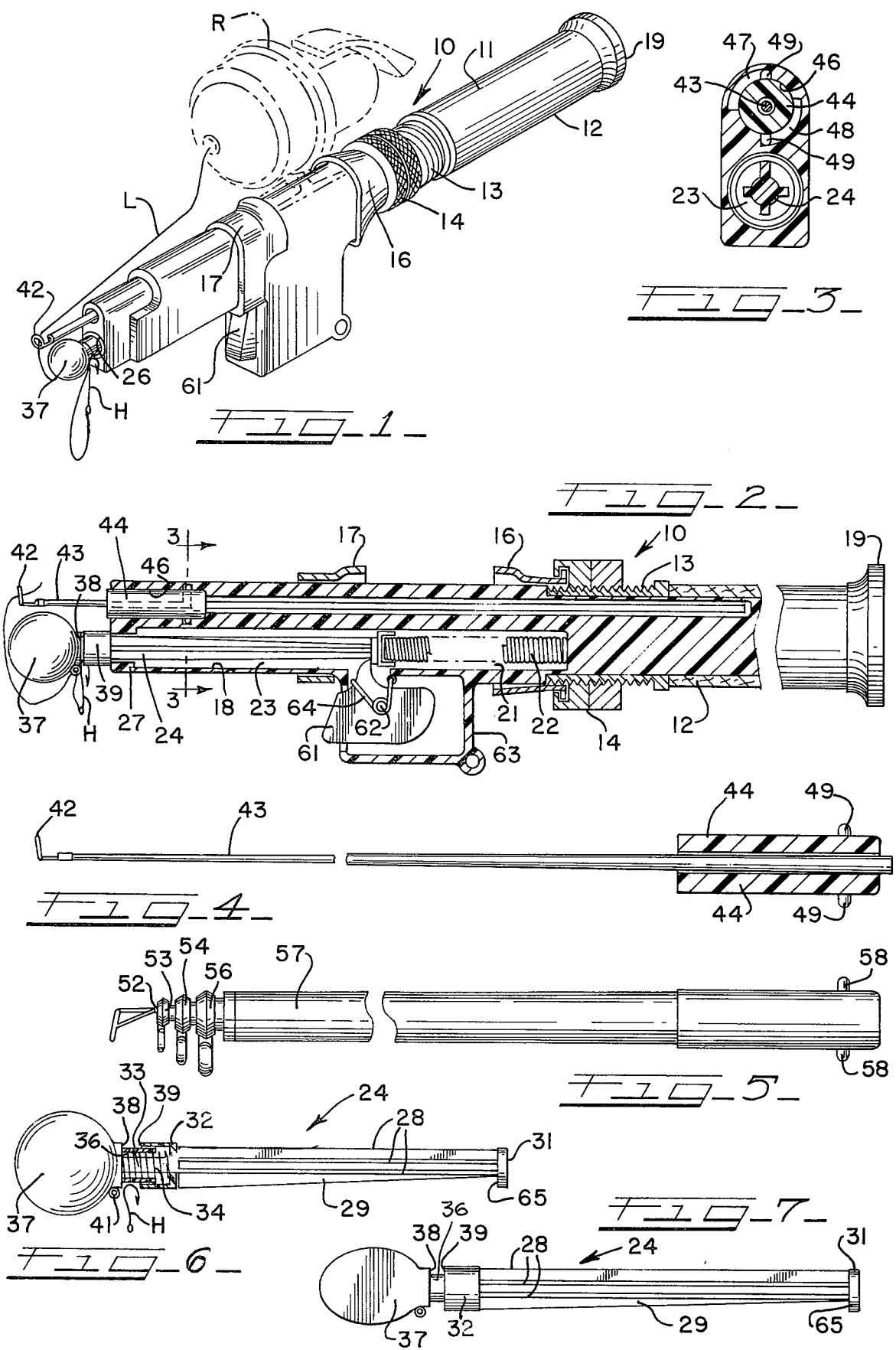

TARGET FISHING ROD

BACKGROUND AND SUMMARY OF THE INVENTION

The present invention relates to fishing rods and more particularly to a new and novel fishing rod having propellant means for casting the hook and line toward a fish, as well as the conventional casting means.

The fishing rod of the present invention comprises generally a grip means for attaching a reel to the handle, a line guiding means, a float having means for detachably retaining a hook therein, and a triggered propellant means for propelling the float with the hook attached thereto toward the water and in the location in which it is desired to fish.

BRIEF DESCRIPTION OF THE DRAWINGS

FIG. 1 is a perspective view of the fishing rod assembly of the present invention with the target float in position for target casting.

FIG. 2 is a longitudinal cross sectional view of the rod assembly.

FIG. 3 is a cross sectional view taken generally along the lines 3—3 of FIG. 2.

FIG. 4 is a view of the removable guide rod with some of the parts shown in section.

FIG. 5 is a view of an alternate removable telescopic rod.

FIG. 6 is a side elevational view of the target float sub-assembly partially in cross section with the float shown in a hook release position.

FIG. 7 is a side elevational view of the target float sub-assembly with the parts shown in the hook retention position.

DESCRIPTION OF THE PREFERRED EMBODIMENTS

Referring now to the drawings, there is shown the fishing rod assembly 10 embodying the structure of the present invention. The fishing rod assembly 10 includes a handle 11 having a cork grip section 12 at one end of which there is secured a threaded sleeve 13. A double nut 14 is threaded on the sleeve 13 and mounts a clamping ring 16 which serves to grip one leg of the reel mounting assembly and reel R. The other leg of the reel R is retained in stationary retainer ring 17. The ring 16 and retainer ring 17 coact in the usual manner to clamp and mount the reel R on the grip.

A bore 18 is formed in the end of the handle 11 at a location remote from the butt 19. The bore 18 at its inner end defines a spring chamber 21 housing a compression spring 22. A float chamber 23 is provided contiguous with the spring chamber 21. The float chamber 23 is adapted to receive a float sub-assembly 24 which is insertable therein through an opening 26 which is axially aligned with the float chamber 23.

The float sub-assembly 24 includes a plurality of radially extending ribs 28 of which at least one of the ribs 29 is tapered lengthwise with the narrower end disposed adjacent a trigger plate 31.

An open ended housing 32 is fixed to the other end of the ribs and includes an axial post 33 on which a compression spring 34 is guided. A cap 36 is frictionally retained in the housing tending to hold the cap within the housing 32. A float 37 is fastened to the cap 36 and provides an annular shoulder 38 which abuts against the end face 39 of the housing 32. A fish hook H is attached to a line L extending from the reel R and threaded through a guide 41 on the float 37. The hook H is releasably clamped between the annular shoulder 38 and the end face of the cap 39.

The line L also passes through a guide 42 mounted on the end of a rod 43. The rod 43 is frictionally retained within a cylindrical sleeve 44. The sleeve 44 is inserted in a cavity 46 having diametrically located quarter slots 47–48 which receive diametrically opposed pins 49 in the nature of a bayonet joint. The rod 43 is extensible through the sleeve 44 so that the rod 10 may be used manually as a fishing rod for casting in the conventional way. The sub-assembly 42–49 may be replaced by a plurality of extensible rod sections 52, 53, 54 and 56 all housed in a sleeve 57 having diametrically opposed pins 58 insertable similar to the sleeve 44. The rod can then be used for casting in the ordinary manner. When the grip means is whipped out in the act of casting the telescoping sections pay out and form a regulation length casting rod.

The float sub-assembly 24 is retained in the bore 23 by a trigger 61 which is pivotal about a pin 62 fixed in a trigger housing 63. The trigger 61 is normally biased by a U-spring 64 so as to seat against a ledge 65 on the float disc 31. In this manner the float sub-assembly is held in the bore against the force of the biasing spring 22.

To operate the rod assembly, the end of the rod is pointed in the general direction in which it is desired to cast. Thereafter the trigger 61 is depressed so that the remainder of the trigger body is clear of the disc 31. The force of the biasing spring 22 is thereafter free to propel the float assembly outward of the bore toward the desired target area.

The releasing of the spring 22 immediately forces the float assembly 24 outwardly toward the target area, carrying the hook and line with it. When the assembly moves outwardly, the spring 34 separates the shoulder 38 and disc 39 thereby releasing the hook H. The hook H is thus freed during casting and the line is drawn from the reel R in the usual manner.

What is claimed is:

1. A fishing rod comprising a grip means for mounting a fishing line reel thereon, a float sub-assembly for releasably retaining a fishing line, said float assembly comprising a float and a float carrier, means mounting said float on said float carrier for movement between a fish hook clamping position and a hook released position, bore means housing said float sub-assembly in one end of said grip, means for propelling said float sub-assembly from said bore toward a fishing target area, and trigger means for retaining said float sub-assembly in said bore against the force of said propelling means, and for releasing said float sub-assembly for propelling movement toward a target area.

2. The invention as defined in claim 1 (amended) wherein coacting shoulder means is provided on said float and said float carrier for releasably carrying the fish hook, and biasing means is operative to release the fishing hook when the float carrier is released from the bore.

3. The invention as defined in claim 1 (amended) wherein a fishing rod means including a plurality of telescopically extensible rod sections may be used alternatively with said target rod.

4. The invention as defined in claim 1 (amended) wherein said hand grip includes a fishing line and rod means having a guide.

5. The invention as defined in claim 3 wherein said fishing rod means is removably mounted in said hand grip.

* * * * *